(12) United States Patent
Numata (10) Patent No.: US 8,937,738 B2
(45) Date of Patent: Jan. 20, 2015

(54) IMAGE FORMING APPARATUS FOR SETTING INFORMATION ABOUT EACH APPLICATION CAN BE INPUT WITHOUT INVOLVING AN API SPECIFIC TO THE APPLICATION

(71) Applicant: Canon Kabushiki Kaisha, Tokyo (JP)

(72) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/671,439

(22) Filed: Nov. 7, 2012

(65) Prior Publication Data

US 2013/0063782 A1    Mar. 14, 2013

Related U.S. Application Data

(63) Continuation of application No. 12/624,224, filed on Nov. 23, 2009, now Pat. No. 8,330,983.

(30) Foreign Application Priority Data

Nov. 28, 2008    (JP) .................................. 2008-304595

(51) Int. Cl.
*G06F 15/00* (2006.01)
*G06F 3/12* (2006.01)
*G06K 1/00* (2006.01)
*G06K 15/02* (2006.01)
*G06F 9/445* (2006.01)

(52) U.S. Cl.
CPC ............ *G06K 15/1803* (2013.01); *G06K 15/02* (2013.01); *G06F 3/1204* (2013.01); *G06F 3/1224* (2013.01); *G06F 3/1288* (2013.01); *G06F 9/44505* (2013.01)
USPC ......................................... 358/1.15; 358/1.13

(58) Field of Classification Search
CPC .. G06K 15/1803; G06K 15/02; G06F 3/1204; G06F 3/1224; G06F 3/1288
See application file for complete search history.

(56) References Cited

U.S. PATENT DOCUMENTS 7,730,225 B2 *    6/2010    Mizuno et al. .................... 710/8
8,117,641 B2 *    2/2012    Morimura et al. ................. 726/1
8,286,160 B2 *    10/2012   Asai .............................. 717/177
8,319,989 B2 *    11/2012   Mizunashi et al. .......... 358/1.15

FOREIGN PATENT DOCUMENTS

JP    2007-206869 A    8/2007
JP    2008-269323 A    11/2008

* cited by examiner

*Primary Examiner* — Douglas Tran
(74) *Attorney, Agent, or Firm* — Canon U.S.A., Inc. IP Division (57) ABSTRACT

An image forming apparatus configured to allow an application to be executed includes a reception unit configured to receive setting information to be used in operation of the application, and a registration unit configured to register setting information in a managing area where a plurality of pieces of the setting information are collectively managed, and a transmission unit to transmit the setting information being associated with the registered application identification information.

10 Claims, 10 Drawing Sheets

| APPLICATION ID 201 | Key 202 | Value 203 |
|---|---|---|
| XXXXXXXX001 | Target Server Address | 192.168.11 |
| XXXXXXXX001 | Save File to | C:¥temp¥Appl |
| XXXXXXXX001 | Log Level | Debug |

| APPLICATION ID | Key | Value | DELETION CANDIDATE FLAG | NUMBER OF INSTALLS |
|---|---|---|---|---|
| XXXXXXX001 | Target Server Address | 192.168.11 | ON | 2 |
| XXXXXXX001 | Save File to | C:¥temp¥Appl | ON | 2 |
| XXXXXXX001 | Log Level | Debug | ON | 2 |

IMAGE FORMING APPARATUS FOR SETTING INFORMATION ABOUT EACH APPLICATION CAN BE INPUT WITHOUT INVOLVING AN API SPECIFIC TO THE APPLICATION

This application is a continuation of application Ser. No. 12/624,224, filed on Nov. 23, 2009, which claims the benefit of Japanese Patent Application No. 2008-304595 filed Nov. 28, 2008, which are hereby incorporated by reference herein in their entirety.

BACKGROUND OF THE INVENTION

1. Field of the Invention

The present invention relates to an image forming apparatus, a method for controlling the image forming apparatus, and a storage medium, which are configured to manage setting information of an application.

2. Description of the Related Art

Conventionally, a plurality of applications can be installed into a multifunction peripheral. Setting information about each installed application is input into a storage area for the application in the multifunction peripheral, via an application program interface (API) specific to each application. Japanese Patent Application Laid-Open No. 2005-63259 discusses a technique of saving information input via an API specific to each application into a common area for a plurality of applications.

In some cases, setting may be desired to be configured for a plurality of applications installed into the multifunction peripheral via an application on a PC. These cases include a case where a server that manages multifunction peripherals collectively configures uniform setting for all of the multifunction peripherals to be managed.

In this case, since an API that inputs setting information varies according to the applications in the multifunction peripheral, a developer needs to develop or customize applications on PCs so that the applications conform to the respective APIs.

SUMMARY OF THE INVENTION

According to an aspect of the present invention, an image forming apparatus configured to allow a plurality of installed applications to be executed includes a storage unit configured to include a storage area storing information about the plurality of applications, and a registration unit configured to receive application information abut the application from an external apparatus without involving the application and to register the received application information into the storage area, wherein the application information includes identification information for identifying the application and usage information to be used by the application.

According to an exemplary embodiment of the present invention, setting information about each application can be input without involving an API specific to the application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
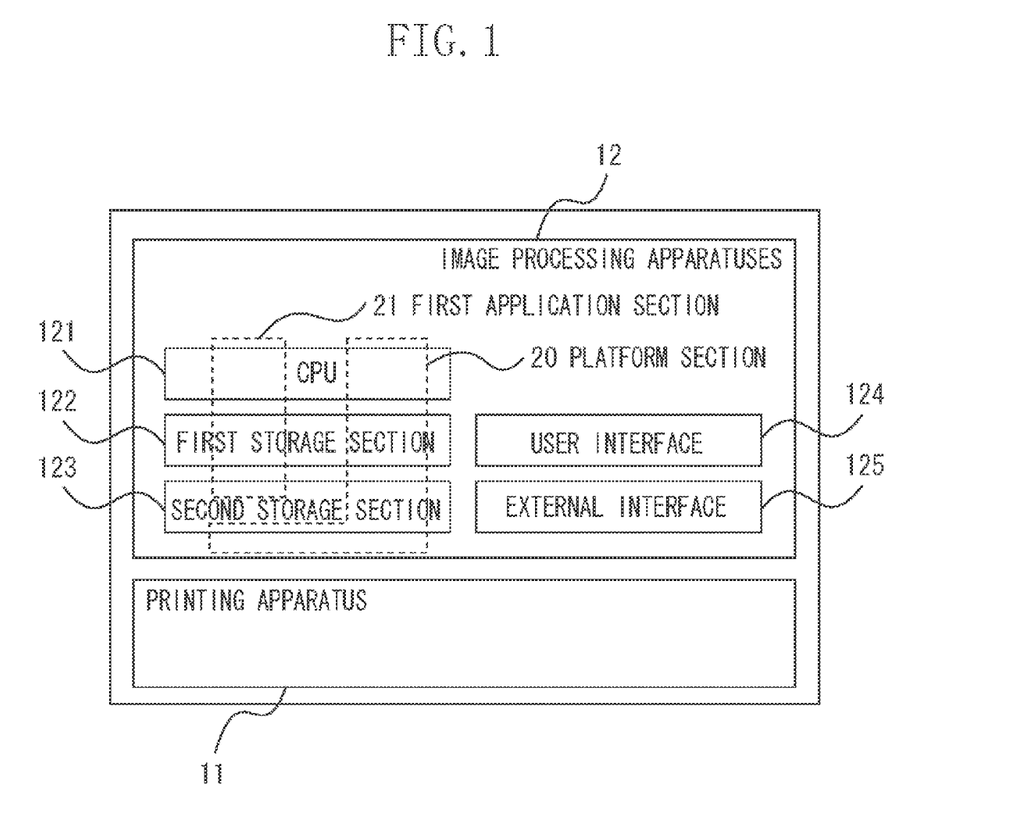
FIG. 1 is a block diagram illustrating an example of a configuration of an image forming apparatus according to a first exemplary embodiment of the present invention.

FIG. 1 is a block diagram illustrating an image forming apparatus 1 as an example of an information processing apparatus according to a first exemplary embodiment of the present invention.

The image forming apparatus 1 includes a printing apparatus 11 and an image processing apparatus 12. The image processing apparatus 12 includes a central processing unit (CPU) 121, a first storage section 122 (for example, random access memory (RAM)), a second storage section 123 (for example, read-only memory (ROM) or hard disk drive (HDD)), a user interface 124, and an external interface 125.

The first storage section 122 is a storage section which exchanges data directly with the CPU 121, and the second storage section 123 is a storage section which exchanges data with the CPU 121 via the first storage section 122. Various application programs and platform programs are stored in the first storage section 122. The CPU 121 executes the various programs stored in the storage sections 122 and 123, and make control to realize functions of the applications and the platforms.

The user interface 124 is a keyboard, a mouse, or a display, and receives an instruction from a user or display data (screen data).

The external interface 125 receives data from an external apparatus or transmits data to an external apparatus. Examples of the external apparatuses are external storage devices such as external HDD and an external universal serial bus (USB) memory, another host computer, and another image forming apparatus, which are connected via a network.

In the first exemplary embodiment, a first application section 21 includes a combination of the following components:

CPU 121;

Storage area in the first storage section 122 where the first application program is stored; and Storage area in the first storage section 122 or the second storage section 123 where information such as calculated results obtained when the CPU 121 processes the first application program or information necessary for the processing is stored.

In the present exemplary embodiment, a portion as a part of the first application program, where the first application section 21 exchanges information or commands with another program is called an API of the first application section 21.

In the present exemplary embodiment, it is necessary that a user input setting information (for example, an IP address of a server of a communication destination) as a part of application information after installation, to allow the first application section 21 to operate. In the first exemplary embodiment, information in the setting information to be used for operating the first application, which should be additionally input after the first application is installed, is called external setting information. The external setting information is stored not in the second storage section 123 of the first application section 21 but in the second storage section 123 of a platform section 20.

In the first exemplary embodiment, the platform section 20, which is an application platform on which a plurality of applications operates, includes a combination of the following components:

CPU 121;

Storage area in the first storage section 122 where the platform application program is stored;

Storage area in the first storage section 122 or the second storage section 123 where information such as calculated results obtained when the CPU 121 processes the platform application program or information necessary for the processing is stored; and Storage area in the second storage section 123 where a destination (management table 200) in which the external setting information to be used by the first application program is registered.

In the present exemplary embodiment, a portion as a part of the platform program where the platform section 20 exchanges information or commands with another program is called an API of the platform section 20.

Figure 2:
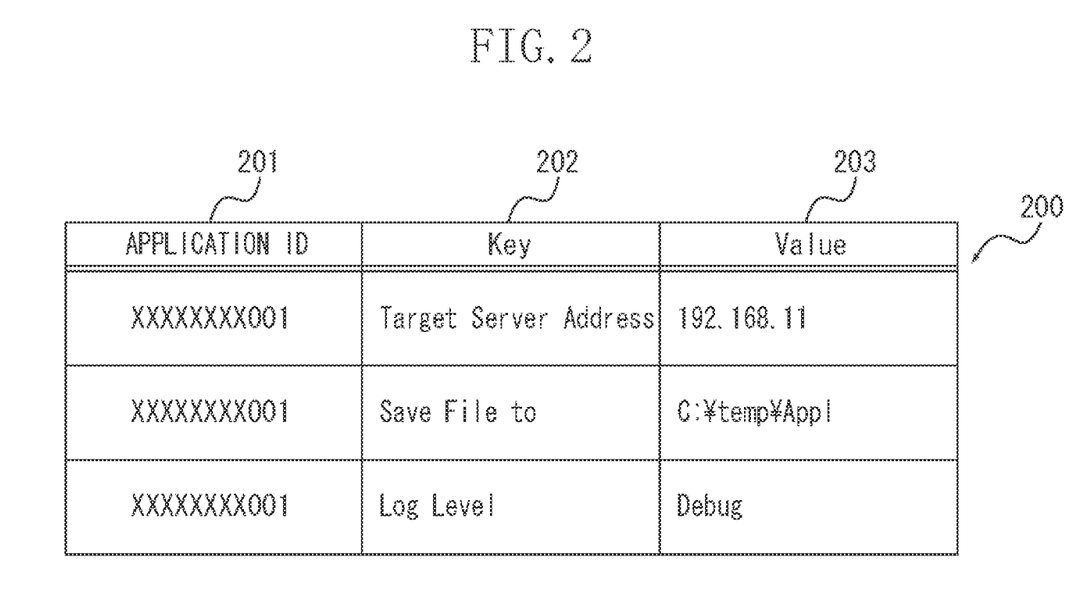
FIG. 2 is a diagram illustrating an example of a management table of external setting information.

The platform section 20 receives external setting information about the first application section 21 via the API of the platform section 20 through the user interface 124 or the external interface 125. The platform section 20 registers the received external setting information not into the storage area of the first application section 21 but into the storage area of the platforms section 20 in the second storage section 123. In the first exemplary embodiment, "to register the external setting information" means "to store each piece of application information in each column of the management table 200, and to complete one record in the management table 200". Examples of the respective pieces of application information are identification information for uniquely identifying the applications and usage information to be used by the applications. The usage information is information to be used for uniquely identifying the external setting information by the applications, namely, the external setting information.

The platform section 20 receives a request for acquiring the external setting information from the first application section 21 via the API of the platform section 20. In response to the reception, the platform section 20 acquires the external setting information about the first application section 21 from the storage area of the platform section 20 in which the external information is registered, and communicates with the first application section 21.

FIG. 2 is a diagram illustrating the management table 200 (management information) of the external setting information about the applications stored in the platform section 20.

Application ID 201 is identification information for uniquely identifying the applications. In the first exemplary embodiment, "XXXXXXXX001" as an ID of the first application is stored.

Key 202 is usage information to be used for uniquely identifying the external setting information by means of the applications. In the first exemplary embodiment, "Target Server Address" indicating a communication destination server information about the applications, "Save File to" indicating a file storage destination, and "Log Level" indicating an output level of a debug log are stored. Values storable in Key 202 are not particularly limited, and may be any values other than character strings.

Value 203 is external setting information corresponding to the Key 202 and is usage information to be used by the applications.

The method for registering external setting information is not limited to the above method. For example, the table structure and the column of the management table 200 are not limited to the above ones but the first application and the external setting information can be uniquely identified.

Figure 3:
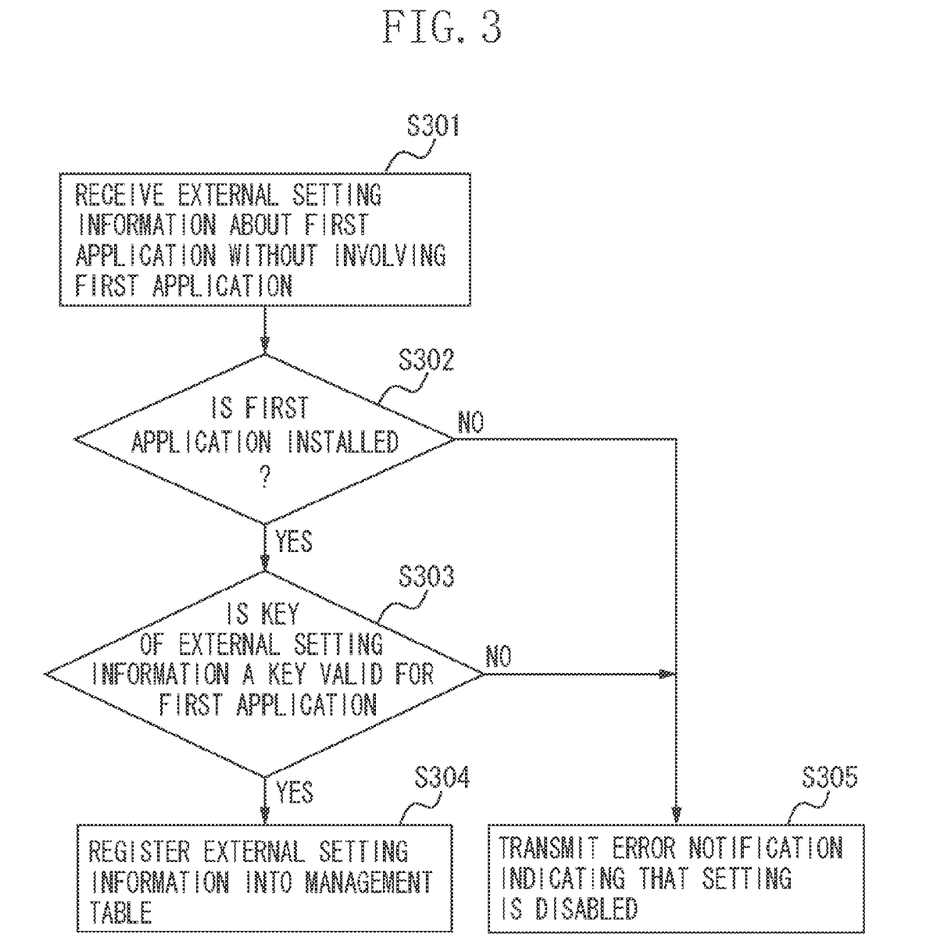
FIG. 3 is a flow chart illustrating a process by a platform section at the time of registering the external setting information.

FIG. 3 is a flow chart illustrating a process by the platform section 20 at the time of registering the external setting information in the present exemplary embodiment. The description refers to a processing flow of receiving the external setting information transmitted from a PC (external apparatus) connected to the image forming apparatus 1 via the network and registering the information into the storage area which can be commonly used by the applications.

In step S301, the platform section 20 receives an external setting information registration request as well as a set of the application ID, Key, and Value (in this example, external setting information). The platform section 20 receives them through the user interface 124 or the external interface 125, via the API of the platform section 20 but without involving the API of the first application section 21. As a result, the platform section 20 can receive the request for registering the external setting information about the respective applications without involving APIs specific to the applications. For this reason, the developers can reduce the time and effort for developing or customizing applications on PC to fit the applications to the APIs specific to applications.

In step S302, the platform section 20 determines whether the first application section 21 corresponding to the received application ID is installed. As a result of the determination, when it is determined that the first application section 21 corresponding to the application ID 201 is not installed, the process proceeds to step S305. In step S305, the platform section 20 does not register the external setting information. Further, the platform section 20 transmits an error message indicating that the external setting information cannot be registered to the user interface 124 or the external interface 125. As a result, external setting information about a not-installed application can be prevented from being registered and wasting a recording capacity of the storage section 123. As a result of the determination in step S302, when it is determined that the first application section 21 corresponding to the application ID 201 is installed, the process proceeds to step S303.

In step S303, the platform section 20 allows the first application section 21 to confirm Key specified by the external setting information registration request is valid Key. As a method for confirming the validity, a method in which the platform section 20 inquires at the first application section 21 is considered. As another method, a method in which the platform section 20 confirms a program file stored in the first storage section 122 as a part of the first application section 21 by itself is considered. The program file is a definition file where a list of Keys to be used by the first application is described. When it is determined that Key specified in step S303 is invalid Key, the process proceeds to step S305. The platform section 20 does not register external setting information in step S305. The platform section 20 transmits an error message indicating that external setting information about Value grouped with the invalid Key cannot be registered to the user interface 124 or the external interface 125. As a result, the dissipation of the storage capacity of the storage section 123 can be prevented by a Key unit. When it is determined that the Key specified in step S303 is invalid Key, the process proceeds to step S304.

In step S304, The platform section 20 registers the valid external setting information into the management table 200.

It is necessary that the platform section 20 knows the application ID and Key of the first application section 21, to register the external setting information without involving the API of the first application section 21. A method for knowing them is not particularly limited. A person skilled in the art can clearly understand that there is a method for informing the platform section 20 when the first application is installed. The platform section 20 can register the external setting information not only about the first application but also a plurality of applications installed in the image forming apparatus into the management table 200.

Figure 4:
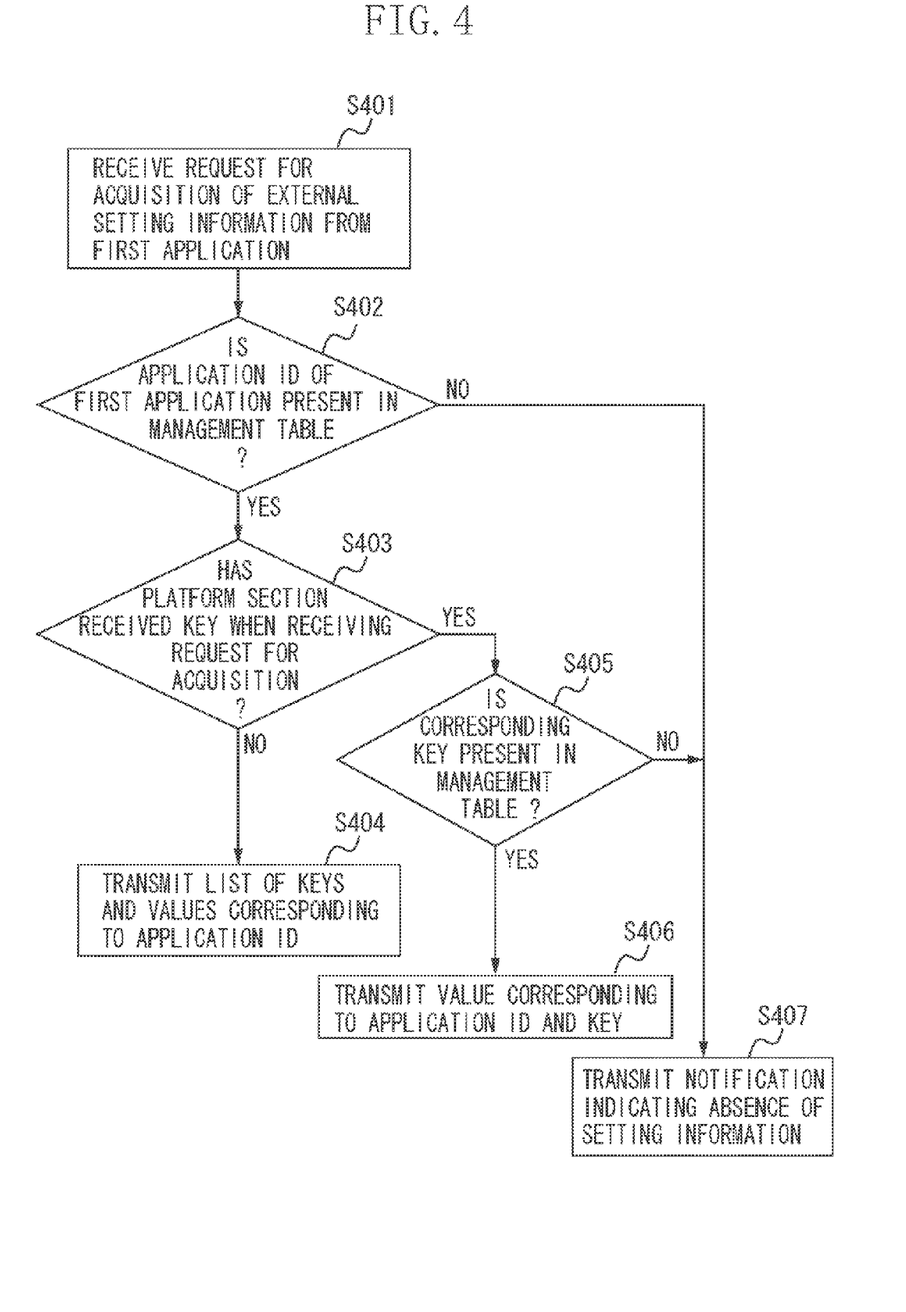
FIG. 4 is a flow chart illustrating a process by the platform section at the time of requesting acquisition of the external setting information.

FIG. 4 is a flow chart illustrating a process by the platform section 20 when the first application section 21 acquires external setting information in the first exemplary embodiment.

In step S401, the platform section 20 receives at least an external setting information acquiring request as well as an application ID from the first application section 21 via the API of the platform section 20.

The platform section 20 determines in step S402 whether external setting information corresponding to the received application ID is present in the management table 200 of FIG. 2. As a result of the determination, when the corresponding external setting information is not present, the process proceeds to step S407. In step S407, the platform section 20 transmits a message indicating that the corresponding external setting information is not present to the first application section 21. As a result of the determination, when the external setting information is present, the process proceeds to step S403.

In step S403, when the platform section 20 has received the external setting information acquiring request from the first application section 21, the platform section 20 determines whether the platform section 20 has received also Key from the first application section 21. When the platform section 20 has not received Key, the process proceeds to step S404. In step S404, the platform section 20 transmits all Keys corresponding to the application ID and Values corresponding to the Keys from the management table 200 to the first application section 21. The platform section 20 transmits all the Keys and the corresponding Values according to such a process, so that the first application section 21 can acquire the entire external setting information.

When the platform section 20 has received also the Key at the time of the request for the acquisition of the external setting information in step S403, the process proceeds to step S405. In step S405, the platform section 20 determines whether external setting information corresponding to the received Key is present in the management table 200. When corresponding external setting information is not present, the process proceeds to step S407. In step S407, the platform section 20 transmits a message indicating that the corresponding external setting information is not present to the first application section 21. When the corresponding external setting information is present, the process proceeds to step S406.

In step S406, the platform section 20 transmits Value corresponding to the application ID and the Key to the first application section 21. When the platform section 20 transmits only the Value corresponding to the Key according to such a process, the first application section 21 can acquire partial external setting information.

In steps S404 and S406, when the platform section 20 transmits Key and Value to the first application section 21, the platform section 20 transmits these pieces of information which are retained in the management table 200. The first application section 21 can acquire the information retained in the management table 200 at any timing and at many times.

A method for deleting external setting information from the management table 200 is described below. In the first exemplary embodiment, two methods are described as the deletion method.

Figure 5:
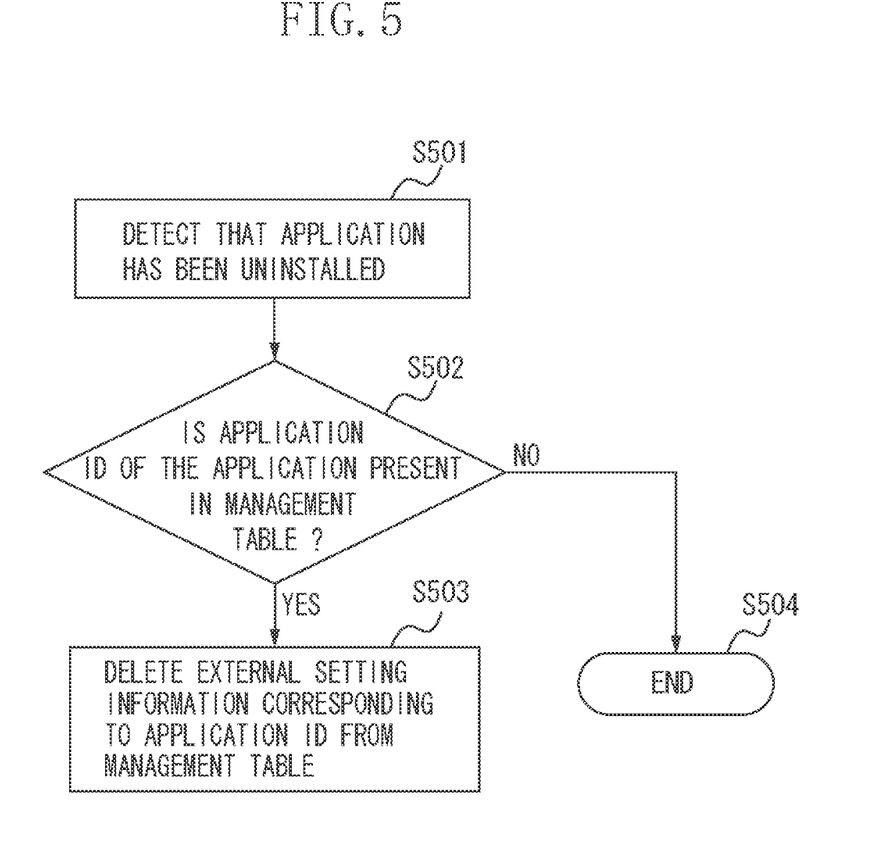
FIG. 5 is a flow chart illustrating a process by the platform section in a first method for deleting the external setting information.

FIG. 5 is a flow chart illustrating a process by the platform section 20 in a first deletion method.

In step S501, the platform section 20 detects that an application has been uninstalled (detection of uninstallation).

In step S502, the platform section 20 determines whether external setting information corresponding to the application ID 201 of the uninstalled application is present in the management table 200. As a result of the determination, when the external setting information is not present, the process proceeds to step S504, and the procedure ends without being particularly executed.

As a result of the determination, when the corresponding external setting information is present, the process proceeds to step S503. In step S503, the platform section 20 deletes the external setting information corresponding to the application ID 201. In the present exemplary embodiment, "to delete the external setting information" means "to delete respective pieces of application information from the respective columns in the management table 200 and to delete one record in the management table 200". Examples of the respective pieces of application information include identification information for uniquely identifying applications, usage information for the applications to uniquely identify external setting information, and external setting information.

When the application is uninstalled, the platform section 20 can delete corresponding external setting information from the storage section 123 according to the first deletion method, and thus can delete useless information from the storage section 123.

The second method for deleting external setting information is described below.

Figure 6:
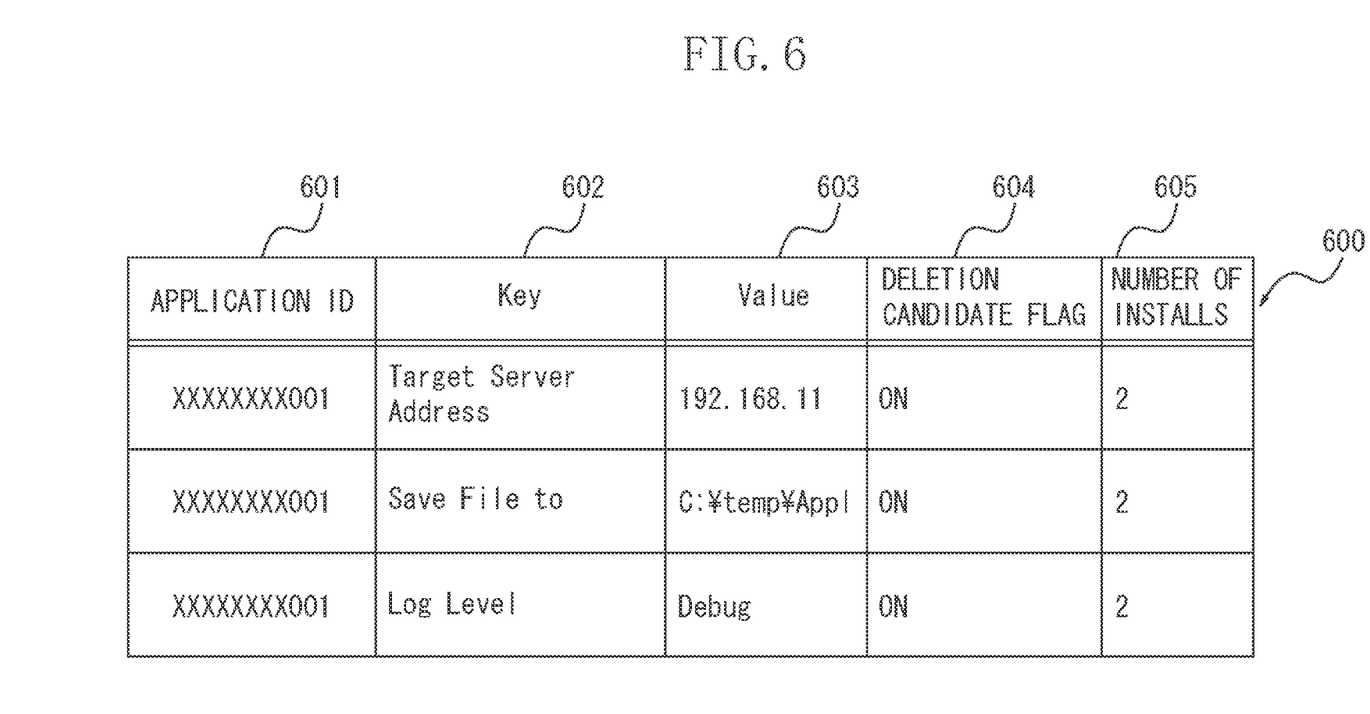
FIG. 6 is a diagram illustrating an example of an extended external setting information management table.

A management table 600 in FIG. 6 is a table obtained by extending the management table 200 in FIG. 2 for realizing the second deletion method. Application ID 601, Key 602, and Value 603 are similar to those illustrated in FIG. 2.

A deletion candidate flag 604 is information which is turned ON when the application corresponding to the application ID 601 is uninstalled. A processing flow at the time of turning ON the deletion candidate flag 604 is not shown, but instead that the external setting information about the uninstalled application is deleted in step S503 in the flow chart of FIG. 5, the deletion candidate flag is turned ON (specification of the deletion candidate).

The number of installs 605 is information obtained by counting the number of installs of any application after the deletion candidate flag 604 is ON.

A table structure and a column of the management table 600 are not limited to these. When a predetermined number of times, described below, is one, the column indicating the number of installs is not necessary.

Figure 7:
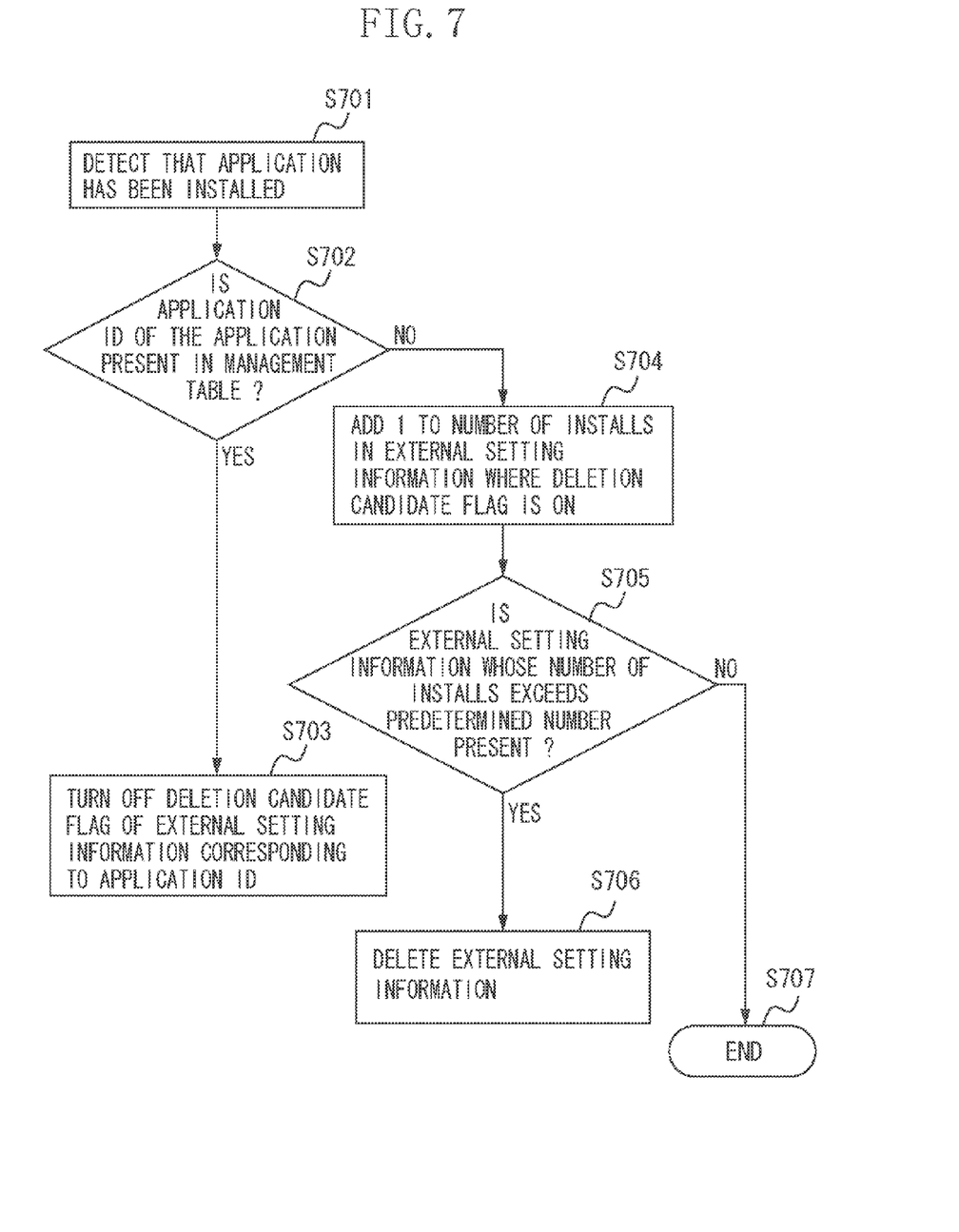
FIG. 7 is a flow chart illustrating a process by the platform section in a second method for deleting the external setting information.

FIG. 7 is a flow chart illustrating a process by the platform section 20 in the second deletion method.

In step S701, the platform section 20 detects that an application has been installed (detection of installation).

In step S702, the platform section 20 determines whether external setting information corresponding to the application ID of the application installed in step S701 is present in the management table 600. When the corresponding external setting information is present, the process proceeds to step S703, in which the platform section 20 turns OFF the deletion candidate flag 604 of the management table 600.

On the other hand, when the external setting information is not present, the process proceeds to step S704. In step S704, the platform section 20 adds 1 to the number of installs 605 in the external setting information where the deletion candidate flag 604 is ON in the management table 600.

In step S705, the platform section 20 determines whether external setting information where the number of installs 605 exceeds a predetermined number is present. As a result of the determination, when the external setting information where the number of installs 605 exceeds the predetermined number is present, the process proceeds to step S706, in which the platform section 20 deletes the above external setting information. As a result of the determination, when the external setting information where the number of installs 605 exceeds the predetermined number of times is not present, the process proceeds to step S706, and ends without being particularly executed.

In the second deletion method, after reinstallation of an application is taken into consideration, even when the application is uninstalled, the external setting information is not immediately deleted. This method, however, has a characteristic such that when another application is installed with the uninstalled application remaining uninstalled over the predetermined number of times, the external setting information corresponding to the uninstalled application is deleted. As a result, in the case of reinstallation, the time and effort of inputting the external setting information again can be reduced, whereas when it is determined that the application is uninstalled without being installed again within the predetermined number of times, the useless external setting information can be deleted from the storage section 123.

In the above-described method, the number of installs is used as a condition of the deletion of the external setting information, but the condition is not limited to this. For example, when a predetermined time elapses after an application is uninstalled, external setting information may be deleted.

Figure 8:
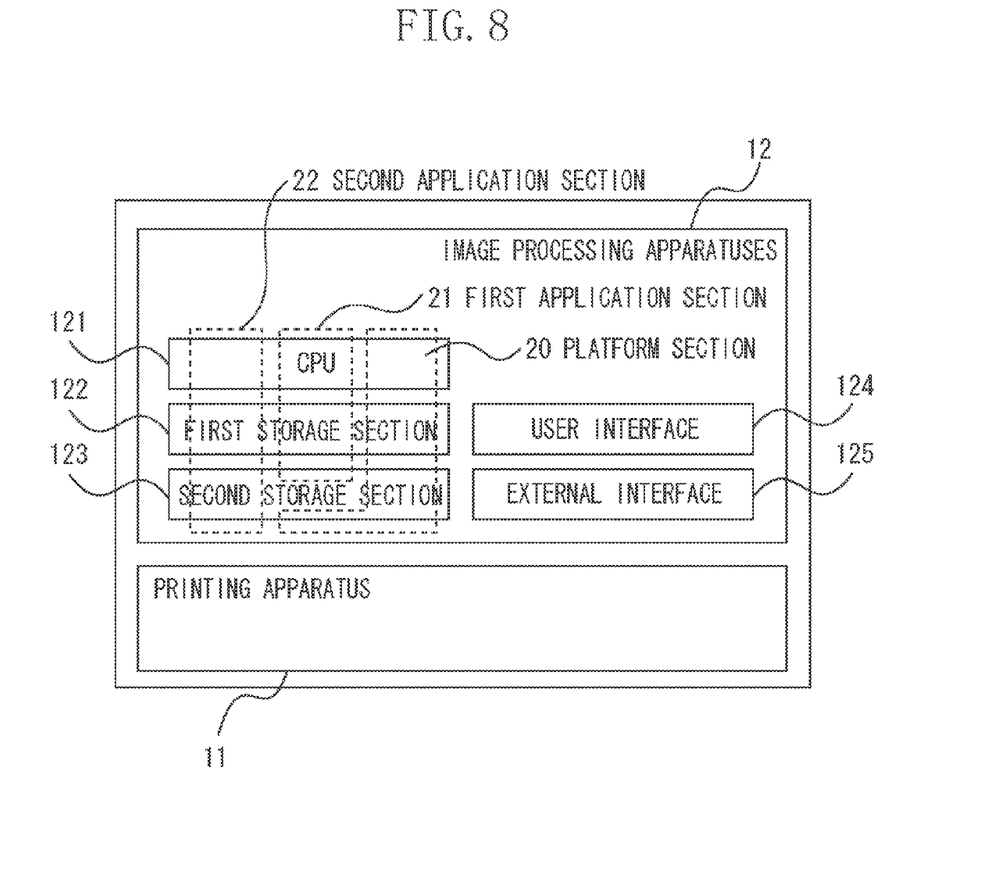
FIG. 8 is a block diagram illustrating an example of a configuration of an image forming apparatus according to a second exemplary embodiment of the present invention.

FIG. 8 is a block diagram illustrating an image forming apparatus according to a second exemplary embodiment of the present invention.

Components other than a second application section 22 are similar to those in the first exemplary embodiment, and description thereof is will not be repeated.

In the present exemplary embodiment, the second application section 22 includes a combination of the following components:
CPU 121;
Storage area in the first storage section 122 where a second application program is stored;
Storage area in the first storage section 122 or the second storage section 123 where information such as calculated results obtained when the CPU 121 processes the second application program or information necessary for the processing is stored; and
Storage area in the second storage section 123 where external setting information to be used by the second application program is stored.

The second application section 22 is different from the first application section 21 in that the external setting information is retained not in the platform section 20 but in the storage area of the second application section 22. Since the second application section 22 retains the external setting information in its storage area, the second application section 22 does not have a function for acquiring the external setting information from the platform section 20, unlike the first application section 21.

The second exemplary embodiment describes the process for registering external setting information in a state that both the first application section 21 and the second application section 22 are present in a single image processing apparatus 12.

In the present exemplary embodiment, two methods are described as the method for registering external setting information.

Figure 9:
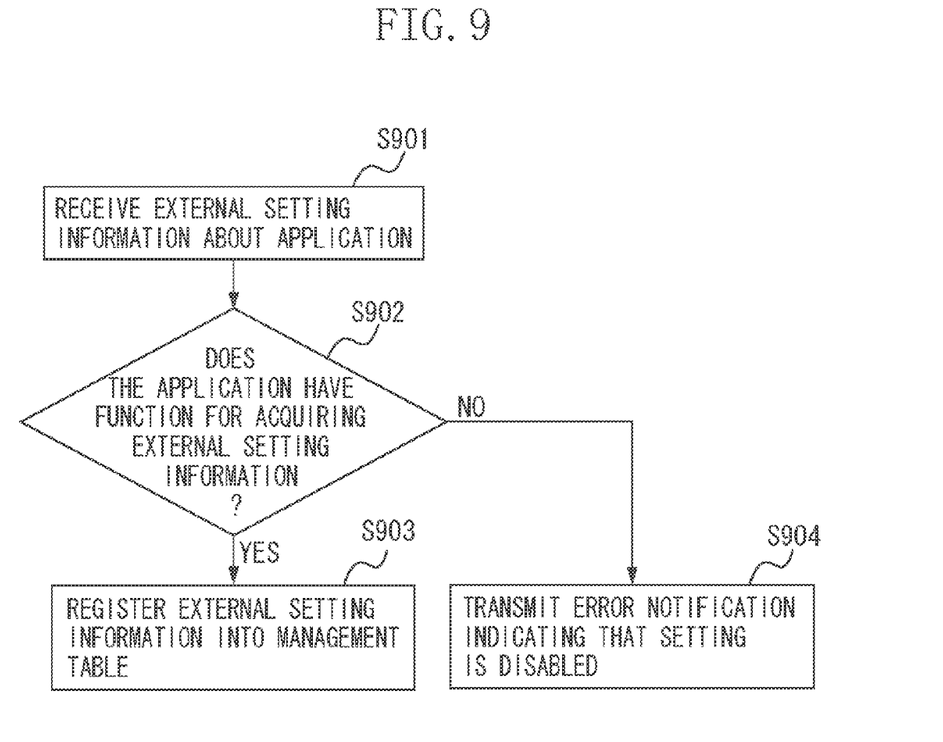
FIG. 9 is a flow chart illustrating a process by the platform section in a first method for registering the external setting information.

FIG. 9 is a flow chart illustrating a process by the platform section 20 in a first registration method.

In step S901, the platform section 20 receives an external setting information registration request as well as a set of application ID, Key, and Value. The platform section 20 receives them through the user interface 124 or the external interface 125, via the API of the platform section 20 but without involving the API of the first application section 21.

In step S902, the platform section 20 determines whether the application corresponding to the received application ID has a function for acquiring external setting information from the platform section 20. As a method for determining presence/non-presence of the function for acquiring external setting information, a method in which the platform section 20 inquires at the application is considered. A method in which the platform section 20 confirms a program file stored in the first storage section 122 as a part of the application (for example, a definition file describing an ability of the application) and determines the presence/non-presence of the function is considered.

When the platform section 20 determines that the application corresponding to the application ID does not have the function for acquiring external setting information from the platform section 20 like the second application section 22, the process proceeds to step S904. In step S904, the platform section 20 does not register external setting information. The platform section 20 transmits an error message indicating that external setting information cannot be registered to the user interface 124 or the external interface 125.

On the other hand, when the platform section 20 determines that the application corresponding to the application ID has the function for acquiring external setting information from the platform section 20 like the first application section 21, the process proceeds to step S903. In step S903, the platform section 20 registers the external setting information into the management table 200.

As a result, even when applications that are different in presence/non-presence of the function for acquiring external setting information coexist in a single image forming apparatus, the registration of useless external setting information can be prevented, and the dissipation of the storage area of the storage section 123 can be prevented.

Figure 10:
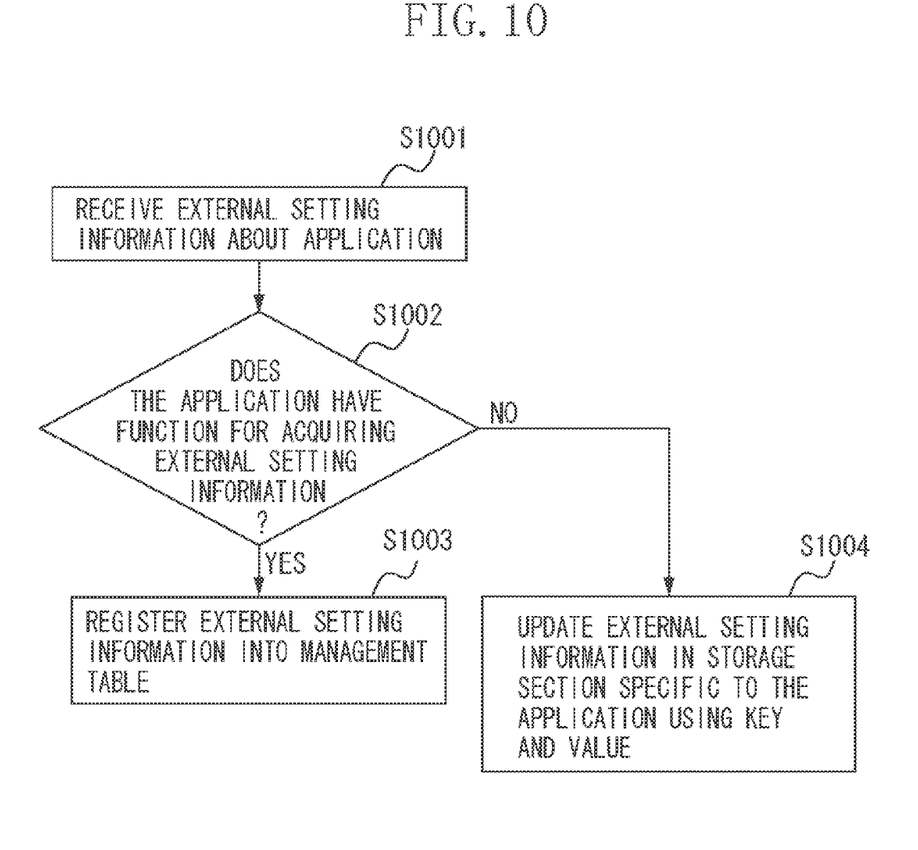
FIG. 10 is a flow chart illustrating a process by the platform section in a second method for registering the external setting information.

FIG. 10 is a flow chart illustrating a process by the platform section 20 in the second registration method.

A step of receiving the external setting information registration request (S1001) and a step of determining presence/non-presence of the external setting information acquiring function of the application (S1002) are similar to the processing steps (S901 and S902) illustrated in FIG. 9. A step of registering external setting information into the management table 200 (S1003) is also similar to the processing step (S903) illustrated in FIG. 9.

In the second registration method, when the application corresponding to the application ID does not have the function for acquiring external setting information from the platform section 20 like the second application section 22, the process proceeds to step S1004. In step S1004, the platform section 20 updates the external setting information about the second application stored in the second storage section 123 of the second application using the received Key and Value.

As a result, even when applications that are different in presence/non-presence of the external setting information acquiring function coexist in a single image forming apparatus, a user can register external setting information without involving the application with the user being unconscious of a difference in the configuration of the internal storage section 123.

Also in the second exemplary embodiment, the determination of the installation of the application S302, the determination of the validity of Key S303, and the first and second deletion processes described in the first exemplary embodiment may be executed.

The present invention is realized also by executing the following process. That is to say, in this process, software (program) which realizes the functions of above exemplary embodiments is supplied to a system or apparatus via a network or various storage media, and a computer (or CPU or microprocessing unit (MPU)) of the system or apparatus reads and executes a program. In this case, the program or a storage medium which stores the program configures the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image forming apparatus configured to allow an application to be executed, the image forming apparatus comprising:
    a reception unit configured to receive setting information to be used in operation of the application and application identification information to identify the application;
    a registration unit configured to register the setting information and the application identification information received by the reception unit in a managing area where a plurality of pieces of the setting information are collectively managed; and
    a transmission unit configured to transmit, in response to a request for setting information from an installed application, the setting information being associated with the application identification information to identify the installed application from among the setting information registered in the managing area to the installed application as setting information of the installed application,
    wherein the reception unit receives the setting information and the application identification information from an external apparatus without using the installed application,
    wherein the transmission unit transmits a message indicating that the requested setting information is not present in response to the request for the setting information from the installed application in a case where the application identification information to identify the installed application is not registered by the registration unit.

2. The image forming apparatus according to claim 1, wherein
    the setting information registered by the registration unit includes at least one of an IP address of a server to which the application communicates, a storage destination of a file and an output level of a debug lug.

3. The image forming apparatus according to claim 1, wherein the reception unit receives the setting information and the application identification information via an application program interface (API) of an application platform where the application is executed, but without an application program interface specific to the application.

4. The image forming apparatus according to claim 3, wherein the registration unit deletes the application identification information to identify the installed application and the setting information being associated with the application identification information to identify the installed application in response to uninstallation of the installed application.

5. The image forming apparatus according to claim 1, further comprising a printing unit.

6. A method for controlling an image forming apparatus configured to allow an application to be executed, the method comprising:
    receiving setting information to be used in operation of the application and application identification information to identify the application;
    registering the setting information and the application identification information received in a managing area where a plurality of pieces of the setting information are collectively managed; and
    transmitting, in response to a request for setting information from an installed application, the setting information being associated with the application identification information to identify the installed application from among the setting information registered in the managing area to the installed application as setting information of the installed application,
    wherein the reception unit receives the setting information and the application identification information from an external apparatus without using the installed application,
    wherein the message is transmitted indicating that the requested setting information is not present in response to the request for the setting information from the installed application in a case where the application identification information to identify the installed application is no registered.

7. The method according to claim 6, wherein
    the setting information registered includes at least one of an IP address of a server to which the application communicates, a storage destination of a file and an output level of a debug lug.

8. The method according to claim 6, wherein receiving the setting information and the application identification information via an application program interface (API) of an application platform where the application is executed, but without an application program interface specific to the application.

9. The method according to claim 8, wherein the application identification information to identify the installed application and the setting information being associated with the application identification information to identify the installed application in response to uninstallation of the installed application is deleted.

10. A non-transitory computer-readable storage medium storing instructions which, when executed by a computer, cause the computer to perform operations of the method according to claim 6.

* * * * *